United States Patent Office 3,586,498
Patented June 22, 1971

---

3,586,498
PROCESS FOR THE SELECTIVE SEPARATION OF FERRIC SULFATE FROM COPPER IN A SULFURIC ACID LEACH SOLUTION
John Bryant Kasey, P.O. Box 15022,
Las Vegas, Nev. 89114
No Drawing. Filed Jan. 2, 1968, Ser. No. 694,869
Int. Cl. C22b 15/12
U.S. Cl. 75—101                              14 Claims

ABSTRACT OF THE DISCLOSURE

A process for the separation of ferric sulfate from copper in a sulfuric acid leach solution, followed by precipitation of the copper from the leach solution by means of the addition of metallic iron. The process is characterized by the selective separation of ferric sulfate from copper in the sulfuric acid leach solution, prior to precipitation of the copper, by the addition of a carbonate salt. The process minimizes the metallic iron requirement and is useful in the hydrometallurgical recovery of copper from copper containing ores and materials.

BACKGROUND OF THE INVENTION

(I) Field of the invention

This invention relates to the selective separation of ferric sulfate from copper in a sulfuric acid leach solution. The invention also relates to the separation of copper from copper containing materials. It further relates to the hydrometallurgical separation of copper from copper containing materials by means of a sulfuric acid leach solution.

(II) Description of the prior art

In the present state of the art of hydrometallurgically recovering copper from copper containing materials, such as low or high grade oxide, sulfide, or mixed oxide-sulfide copper ores, weak sulfuric acid leach solutions are applied to the surface of the copper containing material. This is accomplished by either spraying the weak sulfuric acid leach solution onto dumps, heaps or mounds of the copper containing material or ore, or running it into shallow ponds on top of the more or less level copper containing material or ore and allowing it to slowly percolate downward. The sulfuric acid leach solution is collected in a leach pond which is usually located in a canyon or on a gently sloping, flat surface which has been prepared in advance and rendered leak proof, so that the emerging "pregnant" dilute sulfuric acid leach solution can be collected in a pond. The leach solution is then pumped into a storage or blending reservoir and thence fed in a regulated amount into vessels, vats, or launders in which the precipitation of copper takes place. The copper precipitation is accomplished by means of the addition of scrap or powdered, metallic iron to the sulfuric acid leach solution. The precipitation reaction is a simple replacement reaction. The metallic iron precipitates or "cements out" the copper from the leach solution, while an equivalent amount of iron goes into solution as ferrous sulfate. The precipitated copper is then physically separated from the ferrous sulfate containing sulfuric acid leach solution.

The general practice of all hydrometallurgical operators recovering copper from a copper containing material or ore is to fortify or strengthen the above ferrous sulfate containing sulfuric acid leach solution to a sulfuric acid concentration of about 1% by weight sulfuric acid, and return or recycle the solution to the copper containing material being leached. Thus additional copper is leached or dissolved and the cycle is completed by the precipitation of this copper in the manner described above. The process is repeated until all the copper is extracted from the copper containing material or ore.

The use of such sulfuric acid solutions containing ferrous sulfate as generated during the precipitation of the copper and the application of such iron-bearing solutions to leach additional copper has several serious disadvantages. Briefly, during the downward percolation of the ferrous sulfate-containing acid leach solution, the ferrous iron is oxidized to the ferric state by the oxygen in the air and that present in the open spaces between the particles and pieces of the copper containing materials or ore. This ferric sulfate is readily precipitated by the basic constituents of the material or ore, thereby coating every particle and piece with a slimy, impervious layer of hydrated basic iron sulfate, which impedes the rapid dissolution of the copper in the material to a point which becomes uneconomical.

Oxidation of ferrous sulfate to the ferric state is usually complete if retention time, of the ferrous sulfate containing leach solution within the dump, heap, or mound of the copper containing material or ore, is sufficiently long and the permeability of a degree to permit air to come in contact with the solution. Thus, precipitation of the iron, in the ferric state as basic iron sulfate and its disposition within the dump, varies with the retention time of the leach solution and depth of the material or ore. Generally, about 50% or more of the total iron present in the solution used to leach the copper from a copper ore is precipitated onto the ore being leached as basic ferric sulfate.

Another disadvantage is that the copper-bearing solution containing the balance of the ferric iron sulfate, when subjected to the action of scrap of powdered iron in the vessels, vats or launders to displace and precipitate the copper, requires more metallic iron per pound of copper displaced than if no ferric sulfate were present. This is because metallic iron reduces ferric sulfate to ferrous sulfate, thus:

$$Fe + Fe_2(SO_4)_3 = 3FeSO_4$$

Therefore, for every pound of iron present as ferric iron one-half pound of metallic iron must be added to effect this reduction to the ferrous state. Thus, the presence of ferric iron sulfate inhibits and competes with the precipitation of metallic copper by the addition of metallic iron to the copper-bearing leach solution.

A further disadvantage lies in the fact that in leaching mixed oxide-sulfide copper ores with dilute sulfuric acid solutions containing ferrous sulphate, the sulfide portion of the ore is not oxidized and dissolved due to the preferential oxidation of the ferrous sulfate by the oxygen in the entrained air. Thus, the copper contained in copper sulfide ores is not possible to recovery so long as ferrous sulphate is present and a deficiency of oxygen exists.

The "pregnant" copper solution, as it comes from the leach dump, contains insufficient free sulfuric acid to promote complete and efficient displacement of copper by iron, as the sulfuric acid content has been generally reduced to an average of one gram per liter. The action of the free acid upon the scrap or powdered iron generates nascent hydrogen at the surface of the iron, which greatly increases precipitation of the copper and facilitates its removal from the surface of the iron. This, therefore, requires that an additional amount of acid be added to the solution. However, more iron is consumed thereby. Thus, the cost of each pound of copper recovered is increased by the additional cost of the acid added and the excess iron consumed.

Theoretically, 56 pounds of iron precipitates 63.5 pounds of copper. In practice, due to the above presence of ferric iron sulfate and additional free acid, about twice this amount of iron is necessary.

OBJECTS AND SUMMARY OF INVENTION

It is therefore a specific object of this invention to provide a process for the separation of ferric sulfate from copper in a dilute sulfuric acid leach solution.

A further object is to provide an improved continuous process for the separation of copper from copper containing materials.

A still further object is to provide a process for the hydrometallurgical separation of copper from copper containing materials wherein basic iron sulfate precipitation on the material being leached is avoided.

Another object is to provide a process for the hydrometallurgical separation of copper from copper containing materials which minimizes the metallic iron precipitant and free acid requirement.

These and the other objects of this invention are accomplished by a process for the separation of ferric sulfate from copper in a sulfuric acid leach which comprises the steps of:

(1) Maintaining the temperature of the sulfuric acid leach solution in the range from about 32° F. to 158° F.

(2) Adding a carbonate salt to the sulfuric acid leach solution, thereby adjusting the pH of the sulfuric acid leach solution in the range from about 3.0 to 6.0 and precipitating basic iron sulfate, the carbonate salt being selected from the group consisting of calcium, barium, strontium, magnesium, sodium, potassium, and ammonium carbonate and mixtures thereof; and (3) Separating the basic ferric sulfate from the copper in the sulfuric acid leach solution.

The above process in effect is a selective precipitation and separation of ferric sulfate from copper in a sulfuric acid leach solution. The desirability of the removal of iron from leach solutions, as stated above, was previously shown. In fact, to remove as much of this additional iron as possible from barren solutions before acidification and return to the ore dump, ponds covering many acres of ground are used to attempt the oxidation of a part of the ferrous sulfate to ferric sulfate and precipitating it out as basic ferric sulfate upon standing. The present invention makes such ponds unnecessary. It also does away with the necessity of having to "bleed" or discard from 15–20% of the "tails" solutions to avoid too high a build-up of ferrous sulfate in the leach solution prior to its reacidification and recycle to the ore dump. The unexpected and surprising process of this invention, by selectively precipitating any ferric iron which is present in the pregnant leach solution coming from the copper containing material, accomplishes the desired result and yields a copper sulfate solution free of ferric iron.

The new process of this invention has to my knowledge never been known or practiced. This is felt to be due to the fact that known iron precipitants are too high in cost for large scale commercial operations and unusable due to their much greater reactivity which results in copper precipitation as well as iron precipitation. This prohibits their use.

A preferred embodiment of this invention concerns an improved, continuous process for the recovery of copper from copper containing materials. Thus, a process is provided for the separation of copper from a copper containing material by leaching the copper containing material with a sulfuric acid leach solution and precipitating copper from the sulfuric acid leach solution by the addition of metallic iron to the sulfuric acid leach solution and recycling the sulfuric acid leach solution containing dissolved iron to separate more copper from the copper containing material, the improvement which comprises separating ferric sulfate from the copper in the sulfuric acid leach solution, prior to precipitating copper by the addition of the metallic iron, by a process which comprises the steps of:

(1) Maintaining the temperature of the sulfuric acid leach solution in the range from about 32° F. to 158° F.

(2) Adding a carbonate salt to the sulfuric acid leach solution, thereby adjusting the pH of the sulfuric acid leach solution in the range from about 3.0 to 6.0 and precipitating basic ferric sulfate, the carbonate salt being selected from the group consisting of calcium, barium, strontium, magnesium, sodium, potassium, and ammonium carbonate and mixtures thereof; and (3) Separating the basic ferric sulfate from the copper in the sulfuric acid leach solution.

The copper containing materials utilized in the practice of this invention include low and high grade oxide, sulfide, and mixed oxide-sulfide copper ores. These ores may be in the form of dumps, heaps, or mounds of material. The ore may be broken and it may or may not be sized prior to treatment. Copper oxide ores are preferred ores. The copper containing material may also be scrap metal, other ores, and the like materials.

The acid leach solution of this invention is a weak sulfuric acid solution. Generally, the sulfuric acid content is in the range from about 0.5 to 3.0 percent by weight. The preferred concentration is about 1.0 percent by weight. The leach acid concentration is not critical other than too weak a solution will be slow and inefficient, and too strong a solution is uneconomical and creates handling and safety problems.

The carbonate salt utilized in the practice of this invention is selected from the group consisting of calcium, barium, strontium, magnesium, sodium, potassium, and ammonium carbonate and mixtures thereof. Limestone and mixtures thereof are contemplated. The most preferred carbonate salts are precipitated calcium carbonate and chemical grade limestone.

Since the use of precipitated calcium carbonate involves a relatively high reagent cost, I prefer to use a chemical grade limestone containing on an average 96% $CaCO_3$. However, a lower grade material may be used, though more is required. While an air or water floated carbonate salt of about minus 325 mesh is the preferred material to use to effect complete iron precipitation in a minimum of time, material as coarse as plus 200 mesh, and coarser, may be used to advantage.

In using the term "limestone," it is understood to mean and encompass the natural minerals calcite, marble, and aragonite, all of which are comprised in the main of calcium carbonate, but have a different crystal form or have been formed under different conditions. It also includes corals, oyster and clam shells, marl, travertine, and like materials containing a variable quantity of calcium carbonate.

In addition to calcium carbonate, as contained in limestone, being the preferred material, natural minerals such as barium carbonate (witherite), strontium carbonate (strontianite), or magnesium carbonate (magnesite) may be used, as well as synthetically prepared carbonates of these elements. Since the double carbonate of calcium and magnesium, dolomite, and limestones of variable and lower magnesium content are abundant and widespread, these may be preferred to be used when finely-ground as precipitants of ferric sulfate, it having been determined that all are good precipitants of ferric sulfate according to the process of this invention. I have found, however, that precipitation efficiency with these materials, as to time, is sacrificed. The reaction between finely-ground dolomite, for example, is much slower than for relatively pure limestone of the same mesh. This is in accord with the greater resistance of dolomite to solution by an acid, as compared with low-magnesium limestone or chemical grade limestone. In addition, copper-bearing limestones may be used as the precipitant, with recovery of the copper in a water or acid-soluble form.

In some situations and under certain circumstances mixtures of any of the above compounds, natural or synthetic, may be used as precipitants; as, for example, a stoichiometric amount of sodium carbonate equivalent to the free sulfuric acid present in the solution and the balance of the precipitant mixture being finely-ground, chemical grade limestone, sufficient to precipitate all of the ferric iron.

The problem of iron removal, or at least reduction of the amount of the element being returned to the ore dump in the reacidified solution, has been and is of paramount importance. This is attested to by the fact that, in the use of scrap, metallic iron to precipitate copper out of the pregnant solution, double the stoichiometric required quantity of iron is introduced into solution. The adverse effect of this iron upon the extractive efficiency of the sulfuric acid leach solution has already been mentioned.

The present invention, which shall be discussed below in terms of the preferred carbonate salt for the sake of clarity, is based on my discovery that a carbonate salt, such as the preferred calcium carbonate or limestone, in a finely-ground or precipitated state, when added in sufficient quantity to a copper-baring leach solution, containing an iron content present as ferric sulfate, selectively precipitates the ferric iron completely as basic ferric sulfate without affecting the copper which remains in solution. The calcium carbonate or limestone first reacts with the free sulfuric acid, if present, to form calcium sulfate, water, and free carbon dioxide gas. An excess of calcium carbonate renders the solution in the pH range from about 3.0 to 6.0 at which point the ferric sulfate begins to react with the calcium carbonate until it is completely precipitated out of the solution as basic ferric sulfate, leaving the copper sulfate unreacted and, upon filtration to remove the precipitated ferric compound, the customary blue color or iron-free copper sulfate solution constitutes the filtrate.

Selective precipitation of ferric iron takes place as follows:

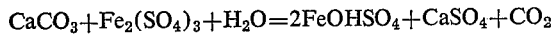

$$CaCO_3 + Fe_2(SO_4)_3 + H_2O = 2FeOHSO_4 + CaSO_4 + CO_2$$

The selective precipitation of ferric iron from a sulfate solution occurs in the temperature range from about 32° F. to about 158° F. As the higher temperature, 158° F., is approached, copper sulfate begins to react with any excess of calcium carbonate present at the same time. This reaction can be utilized to remove copper from a solution from which ferric iron had been previously removed by precipitation and filtration in the above range of temperature. Precipitation of ferric iron from a sulfate solution is most practical and economical at room or ordinary prevailing atmospheric temperatures. As the lower temperature, 32° F., is approached, the reaction becomes very slow.

During the precipitation of the ferric iron, the simultaneously-formed calcium sulfate co-precipitates in major amount, although complete precipitation of the calcium sulfate occurs only on the solution standing quiescent for several hours or more.

From the above equation it is observed that one equivalent of calcium carbonate theoretically precipitates two equivalents of ferric iron. Therefore, there are required 100 parts of pure calcium carbonate for every 112 parts of ferric iron present, or, the iron content present by analysis of the solution times the factor 0.893 equals the amount of calcium carbonate required to precipitate it. Also, for every 98 parts of free sulfuric acid present, 100 parts of pure calcium carbonate is required to neutralize the free acid, or, the acid content as analyzed times the factor 1.02 equals the calcium carbonate required to neutralize it.

I have found, however, that an excess of calcium carbonate, or any other carbonate salt, is necessary to substantially neutralize all the free acid and precipitate all of the ferric iron in a reasonable time. This excess varies with the particle size of the added carbonate salt and the length of time and force of agitation after its addition to a sulfate solution, since precipitation of the iron and neutralization of the free acid occurs at the surface of the carbonate salt particles, whereby a coating of an insoluble sulfate, such as calcium sulfate, and basic ferric sulfate forms to hinder and retard further reaction. Physical attrition as a result of turbulent mixing plus the disengagement of carbon dioxide gas formed during reaction dislodges such coatings and permits the reactions to proceed to completion.

To assure a reasonable time for the reactions to be completed, the carbonate salt, such as calcium carbonate or limestone, should be ground to an air or water floatable condition, that is, about minus 325 mesh, and agitation must be quite vigorous during the reactions. Coarser material than minus 325 mesh may be used, but the time to complete the reactions is prolonged, unless a mill containing ceramic or rubber lining and ceramic balls or rods is used to reduce the coarse limestone to powder and remove adhering basic ferric sulphate.

Ferric iron from a ferric sulfate solution is not precipitated by the carbonate salt until all acid is substantially neutralized and the hydrogen ion concentration or pH reaches from about 3.0 to 6.0. At the preferred temperature, room temperature, a pH range of about 4.0 to 5.0 is desirable. At this pH precipitation commences and is completed; although, at a higher room temperature, precipitation commences and finishes at a lower hydrogen ion concentration or pH. Conversely, precipitation commences and is completed at a higher pH when the temperature is lowered.

The following examples are illustrative of the practice of this invention:

EXAMPLES 1 AND 2

The efficiency and completeness of the selective precipitation of ferric iron from a ferric sulfate-copper sulfate sulfuric acid leach solution by the use of precipitated, reagent-grade calcium carbonate and air-floated, natural ground limestone, according to the present invention, is shown below. The reagent grade calcium carbonate analyzed 99.97% $CaCO_3$, while the natural limestone analyzed 97.96% $CaCO_3$. In each case 1000 cubic centimeters of ferric sulfate-copper sulfate solution was used, and it analyzed as follows:

| | Grams per litre |
|---|---|
| Copper | 1.31 |
| Free $H_2SO_4$ | 0.4 |
| Ferric iron | 2.68 |

Example No. 1

Using precipitated calcium carbonate.

| | | |
|---|---|---|
| Theoretical required | grams | 2.802 |
| Actually used | do | 6.00 |
| Percentage of excess | | 115.0 |
| Temperature | ° F | 70 |
| Agitation time | minutes | 15 |
| Ferric iron precipitation | | Complete |
| pH of final $CuSO_4$ solution | | 4.5 |

Example No. 2

Using minus 325 mesh natural limestone.

| | |
|---|---|
| Theoretical required _____grams__ | 2.858 |
| Actually used _____do__ | 6.00 |
| Percentage of excess _____ | 110.0 |
| Temperature _____° F__ | 70 |
| Agitation time _____minutes__ | 25 |
| Ferric iron precipitation _____ | Complete |
| pH of final CuSO₄ solution _____ | 4.5 |

On adding the calculated excess of precipitated calcium carbonate or air-floated limestone, reaction begins at once between the calcium carbonate and free sulfuric acid. Calcium sulfate is formed and free carbonic acid. This acid immediately dissociates into carbon dioxide gas and water, the former escaping as bubbles. As the sulfuric acid is consumed, the pH rises, and when it reaches about 3.0, precipitation of the ferric iron begins. The solution becomes turbid and the completion of the iron precipitation is reached when, on settling, the supernatant solution assumes the characteristic bluish-green color of a pure copper sulfate solution. Analysis of the copper sulfate solution, after filtering off the basic ferric sulfate, calcium sulfate, excess calcium carbonate precipitate, showed all iron was removed.

The physical condition of the basic ferric sulfate precipitate is such as to permit rapid and easy filtration and removal of practically all entrained copper sulfate solution by simple washing. In practice, the reacted ferric iron-copper sulfate solution and calcium carbonate mixture is sent into a settler or thickener where the basic ferric sulfate and calcium sulfate slowly settles out and the clear overflow or supernatant liquid contains the pure copper sulfate solution. After thus settling, the precipitated ferric iron sulfate and mixture of calcium sulfate and excess calcium carbonate is filtered, followed by thorough washing with water to remove copper sulfate, and the filter cake is discarded.

It should be understood that I do not limit myself to an excess of carbonate salt, such as the excess of calcium carbonate or limestone as given in the above two examples. The excess of the precipitant is solely governed by the factors already referred to, that is, particle size, attrition between particles, movement of particles or agitation intensity, etc. This excess may be slightly more than that theoretically required, or it can be several hundred percent more than the theoretical, as in the case where an impure material is used or the particle size large.

The process of this invention overcomes the objections to the prior art process and accomplishes the objectives as outlined above. The ferric sulfate is removed from the copper in the sulfuric acid leach solution as desired. Also, less metallic iron and acid are required by the process of this invention.

In addition the ferric sulfate free copper leach solution may, if desired, be made to yield a copper powder, sheet, or slab by direct electrolysis. Efficiency is high. This is because no iron is present. The copper sulfate solution may also be treated with hydrogen sulfide gas to yield pure cupric sulfide, with an equivalent of sulfuric acid being regenerated for reuse. The copper sulfide thus produced may be sold as such to a smelter or it may be processed to the oxide and the sulfur recovered and reused. Solvent extraction may also be used to upgrade the lean copper sulfate to a point enabling its recovery as crystals. Ion exchange may also be used to accomplish the same result, as it can also be accomplished by adding a stoichiometric quantity of air or water-floated calcium carbonate to the iron-free weak copper sulphate solution heated to 158° F. and selectively precipitating the copper as basic copper carbonate, admixed with calcium sulphate, filtering off the mixture of copper carbonate and calcium sulphate, and adding a pre-calculated volume of sulphuric acid solution to dissolve the basic copper carbonate, to yield a solution of any desired concentration of copper, while the admixed calcium sulphate remains undissolved; or, the basic copper carbonate-calcium sulphate admixture can be used as the starting point for the preparation of most any copper compound by the use of any inorganic or organic acid that will form a water-soluble, copper compound solution of desired concentration.

Having thus described my invention, I claim:

1. A process for the separation of ferric sulfate from copper in a sulfuric acid leach solution which comprises the steps of:
    (a) maintaining the temperature of said sulfuric acid leach solution in the range from about 32° F. to 158° F.;
    (b) adding a carbonate salt to said sulfuric acid leach solution, thereby adjusting the pH of said sulfuric acid leach solution in the range from about 3.0 to 6.0 and precipitating basic ferric sulfate, said carbonate salt being selected from the group consisting of calcium, barium, strontium, magnesium, sodium, potassium, and ammonium carbonate and mixtures thereof; and
    (c) separating said basic ferric sulfate from said copper in said sulfuric acid leach solution.

2. The process of claim 1 wherein said carbonate salt is selected from the group of natural carbonate minerals consisting of limestone, dolomite, magnesite, witherite, strontianite, and mixtures thereof.

3. The process of claim 1 wherein said carbonate salt is limestone.

4. The process of claim 1 wherein said carbonate salt is calcium carbonate.

5. The process of claim 1 wherein said carbonate salt has a mesh size from about minus 10 to minus 325.

6. The process of claim 1 wherein the temperature of said sulfuric acid leach solution in step 1 is maintained in the range from about 50° F. to 100° F. and the pH of said sulfuric acid leach solution in step 2 is adjusted in the range from about 4 to 5.

7. In a process for the separation of copper from a copper containing material by leaching the copper containing material with a sulfuric acid leach solution and precipitating copper from the sulfuric acid leach solution by the addition of metallic iron to the sulfuric acid leach solution and recycling the sulfuric acid leach solution containing dissolved iron to separate more copper from the copper containing material, the improvement which comprises separating ferric sulfate from the copper in the sulfuric acid leach solution, prior to precipitating copper by the addition of the metallic iron, by a process which comprises the steps of:
    (a) maintaining the temperature of said sulfuric acid leach solution in the range from about 32° F. to 158° F.;
    (b) adding a carbonate salt to said sulfuric acid leach solution, thereby adjusting the pH of said sulfuric acid leach solution in the range from about 3.0 to 6.0 and precipitating basic iron sulfate, said carbonate salt being selected from the group consisting of calcium, barium, strontium, magnesium, sodium, potassium, and ammonium carbonate and mixtures thereof; and
    (c) separating said basic ferric sulfate from said copper in said sulfuric acid leach solution.

8. The process of claim 7 wherein said copper containing material is selected from the group consisting of low and high grade oxide and sulfide copper ores and mixtures thereof.

9. The process of claim 7 wherein said copper containing material is a copper oxide ore.

10. The process of claim 7 wherein said carbonate salt is selected from the group of natural carbonate minerals consisting of limestone, dolomite, magnesite, witherite, strontianite, and mixtures thereof.

11. The process of claim 7 wherein said carbonate salt is limestone.

12. The process of claim 7 wherein said carbonate salt is calcium carbonate.

13. The process of claim 7 wherein said carbonate salt has a mesh size from about minus 10 to minus 325.

14. The process of claim 7 wherein the temperature of sulfuric acid leach solution in step 1 is maintained in the range from about 50° F. to 100° F. and the pH of said sulfuric acid leach solution in step 2 is adjusted in the range from about 4 to 5.

References Cited

UNITED STATES PATENTS

| | | | |
|---|---|---|---|
| 1,201,899 | 10/1916 | Weidlen | 75—115 |
| 1,580,614 | 4/1926 | Laist et al. | 75—115 |
| 2,647,819 | 8/1953 | McGauley | 75—115 |
| 3,251,646 | 5/1966 | Alon et al. | 23—309 |
| 3,273,997 | 9/1966 | Wilson | 75—117 |
| 3,282,682 | 11/1966 | Harlan | 75—117 |
| 3,347,662 | 10/1967 | Snyder | 75—117 |

L. DEWAYNE RUTLEDGE, Primary Examiner

W. W. STALLARD, Assistant Examiner

U.S. Cl. X.R.

23—125; 75—109, 115, 117